(12) United States Patent
Bruns

(10) Patent No.: US 11,647,698 B2
(45) Date of Patent: May 16, 2023

(54) CHOPPER BLADE WITH HARD FACE

(71) Applicant: DEERE & COMPANY, Moline, IL (US)

(72) Inventor: Justin D. Bruns, Port Byron, IL (US)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 17/065,055

(22) Filed: Oct. 7, 2020

(65) Prior Publication Data
US 2022/0104434 A1 Apr. 7, 2022

(51) Int. Cl.
*A01F 29/09* (2010.01)
*A01F 29/04* (2006.01)
*A01D 41/12* (2006.01)

(52) U.S. Cl.
CPC .......... *A01F 29/09* (2013.01); *A01D 41/1243* (2013.01); *A01F 29/04* (2013.01)

(58) Field of Classification Search
CPC ..... A01F 29/09; A01F 29/04; A01D 41/1243; A01D 34/52
See application file for complete search history.

(56) References Cited

U.S. PATENT DOCUMENTS

| | | | |
|---|---|---|---|
| 2,608,111 A * | 8/1952 | Ratkowski | E02F 9/285 76/115 |
| 4,945,640 A | 8/1990 | Garg et al. | |
| 5,617,636 A | 4/1997 | Taggett et al. | |
| 6,067,784 A | 5/2000 | Jordan | |
| 6,511,374 B2 | 1/2003 | VanEe | |
| 6,857,255 B1 * | 2/2005 | Wilkey | A01D 34/13 56/296 |
| 7,555,889 B2 * | 7/2009 | Priesnitz | B02C 18/18 56/504 |
| 7,677,843 B2 * | 3/2010 | Techel | A01F 29/09 407/119 |
| 8,221,203 B1 | 7/2012 | Flickinger et al. | |
| 9,686,911 B2 | 6/2017 | Stoffel et al. | |
| 9,992,930 B2 | 6/2018 | Stoffel et al. | |
| D842,348 S | 3/2019 | Isaac et al. | |
| 10,225,992 B2 | 3/2019 | Dilts et al. | |
| 10,455,767 B2 | 10/2019 | Adamczyk et al. | |
| 11,172,611 B2 * | 11/2021 | Mayerle | A01D 34/73 |
| 2004/0259611 A1 | 12/2004 | Dow | |
| 2013/0111863 A1 * | 5/2013 | Johnson | A01D 34/736 56/10.1 |
| 2013/0233145 A1 | 9/2013 | Sotelo et al. | |

(Continued)

FOREIGN PATENT DOCUMENTS

| | | | | |
|---|---|---|---|---|
| CA | 2957234 A1 * | 8/2017 | | A01D 34/73 |
| DE | 202005010055 U1 | 11/2006 | | |

(Continued)

*Primary Examiner* — Arpad F Kovacs

(57) ABSTRACT

A chopper blade for use in an agricultural harvester chopper to chop crop residue comprises a blade body and a hard face. The blade body comprises a cutting edge of the chopper blade. The hard face is applied on a surface of the blade body, and is harder than the blade body. The hard face comprises a serration pattern along a cutting edge such that the cutting edge wears to the serration pattern to match the serration pattern to form corresponding serrations in the cutting edge with the serration pattern becoming part of the cutting edge of the chopper blade during use of the chopper blade.

7 Claims, 4 Drawing Sheets

(56) References Cited

U.S. PATENT DOCUMENTS

| | | | |
|---|---|---|---|
| 2014/0045562 A1 | 2/2014 | Adamczyk et al. | |
| 2015/0319922 A1* | 11/2015 | Stoffel | A01D 34/81 56/14.7 |
| 2015/0319923 A1* | 11/2015 | Stoffel | A01D 34/661 427/596 |
| 2016/0073582 A1* | 3/2016 | Stoffel | B23K 26/34 219/76.1 |
| 2016/0157423 A1 | 6/2016 | Stoffel et al. | |
| 2016/0309648 A1* | 10/2016 | Stoffel | B23K 26/0006 |
| 2017/0258006 A1* | 9/2017 | Stoffel | A01D 34/736 |
| 2018/0098479 A1* | 4/2018 | Groves | A01B 33/024 |
| 2019/0281760 A1 | 9/2019 | Mayerle | |

FOREIGN PATENT DOCUMENTS

| | | | |
|---|---|---|---|
| DE | 202006017540 U1 | 2/2007 | |
| DE | 102009028410 B4 | 1/2012 | |
| EP | 0829198 B1 | 1/2002 | |
| EP | 1491084 B1 | 5/2006 | |
| EP | 1247443 B1 | 8/2006 | |
| EP | 1479282 B1 | 8/2006 | |
| EP | 1232683 B2 | 4/2007 | |
| EP | 1588786 B1 | 11/2007 | |
| EP | 1935231 A1 | 6/2008 | |
| EP | 1721514 B1 | 12/2008 | |
| EP | 1757183 B1 | 2/2009 | |
| EP | 2701484 B1 | 7/2015 | |
| EP | 2387873 B1 | 5/2016 | |
| EP | 3153012 A1 | 4/2017 | |
| EP | 3326449 A1 | 5/2018 | |
| EP | 3420804 A1 | 1/2019 | |
| EP | 3485721 A1 | 5/2019 | |
| EP | 3520595 A1 | 8/2019 | |
| EP | 3804492 A1 * | 4/2021 | A01D 34/736 |

* cited by examiner

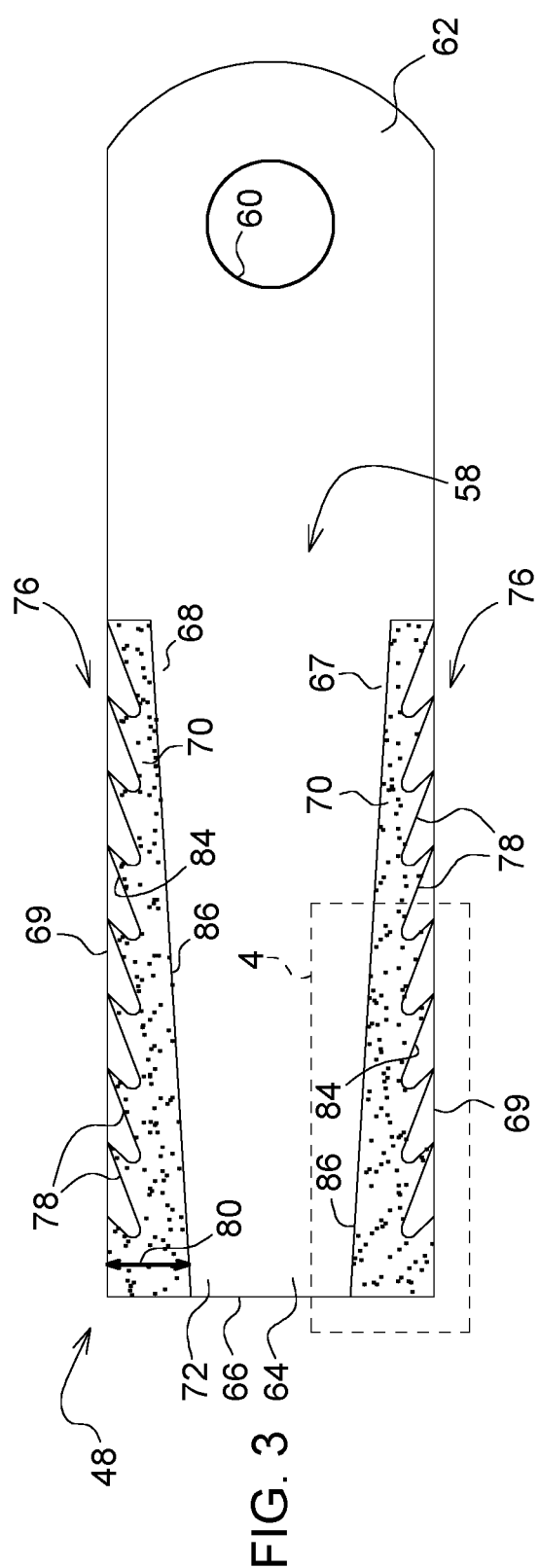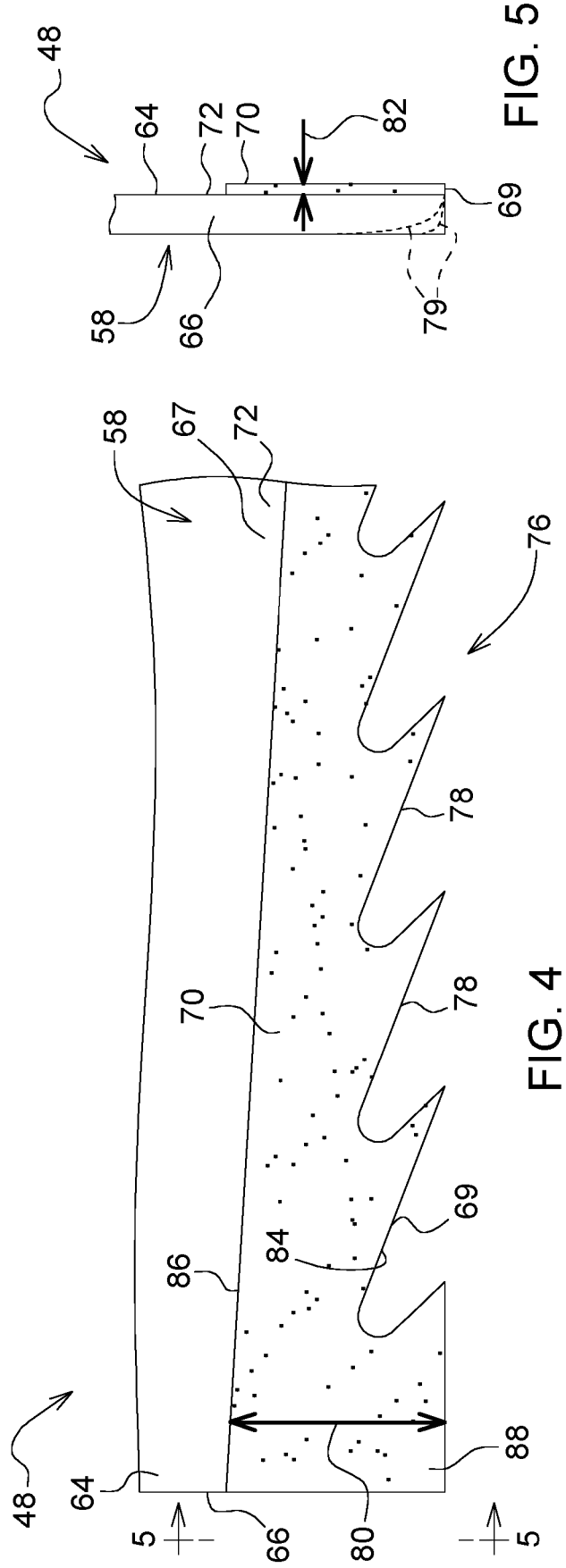

CHOPPER BLADE WITH HARD FACE

FIELD OF THE DISCLOSURE

The present disclosure relates to choppers for agricultural harvesters, in particular, to chopper blades for such choppers.

BACKGROUND OF THE DISCLOSURE

Agricultural harvesters harvest crop from a field and process the harvested crop to separate grain from crop residue. Agricultural harvesters commonly have a residue management system for returning crop residue to the field. Such residue management systems typically have a chopper that chops crop residue into smaller pieces to be spread or otherwise deposited onto the field. The chopper has a plurality of chopper blades that may wear with use over time.

SUMMARY OF THE DISCLOSURE

According to an aspect of the present disclosure, there is disclosed a chopper blade for use in an agricultural harvester chopper to chop crop residue. The chopper blade comprises a blade body and a hard face. The blade body comprises a cutting edge of the chopper blade. The hard face is applied on a surface of the blade body, and is harder than the blade body. The hard face comprises a serration pattern along a cutting edge such that the cutting edge wears to the serration pattern to match the serration pattern to form corresponding serrations in the cutting edge with the serration pattern becoming part of the cutting edge of the chopper blade during use of the chopper blade.

The above and other features will become apparent from the following description and accompanying drawings.

BRIEF DESCRIPTION OF THE DRAWINGS

The detailed description of the drawings refers to the accompanying figures (not drawn to scale) in which:

FIG. 3 is a side elevational view showing a chopper blade with a blade body and a serrated hard face applied to a surface of the blade body, the blade body including a cutting edge shown prior to wear to the hard face; and FIG. 4 is an enlarged side elevational view showing the cutting edge of the blade body worn to match the serration pattern of the hard face;

FIG. 5 is an end elevational view showing the hard face applied to the surface of the blade body and the cutting edge of the blade body worn to the hard face.

DETAILED DESCRIPTION OF THE DRAWINGS

Figure 1:
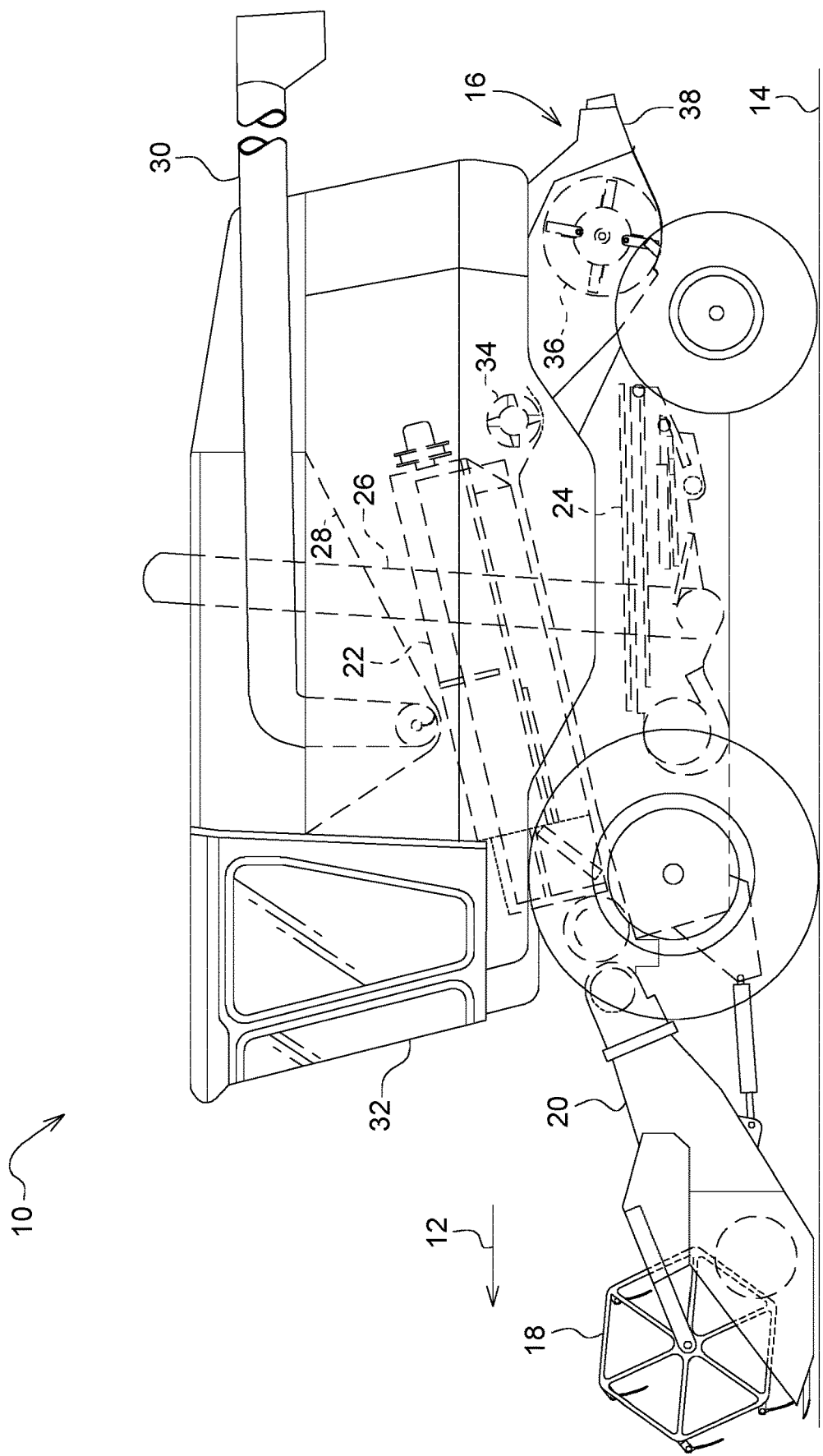
FIG. 1 is a side elevational view showing an agricultural harvester with a chopper mounted toward the rear of the agricultural harvester.

Referring to FIG. 1, an agricultural harvester 10 is configured to move in a forward direction of travel 12 over a field 14 to harvest crop from the field 14. The harvester 10 processes the crop, separating grain from crop residue (e.g., straw, stalks, cobs, leaves, chaff). The harvester 10 includes a residue management system 16 for returning crop residue, derived from harvested crop, back to the field 14.

In general, the harvester 10 can include an implement 18 to cut, gather, and transport crop rearwardly, a feederhouse 20 to advance crop received from the implement 18 into the body of the harvester 10, a threshing and separating section 22 to thresh crop and further separate grain from crop residue, a cleaning section 24 including one more chaffers and sieves to separate grain from chaff or other relatively small pieces of crop material, a clean grain elevator 26 to elevate clean grain to a storage bin 28, an unloader 30 to unload clean grain from the storage bin 28 to another location, and a beater 34 to beat residue that is received from the threshing and separating section 22 and does not pass to the cleaning section 24 (e.g., straw, stalks, cobs, leaves). A person can control the harvester 10 from an operator's station 32 of the harvester 10. The harvester 10, including such portions thereof, can be configured in a wide variety of ways.

The residue management system 16 includes a chopper 36 and a residue spreader 38. The chopper 36 chops crop residue derived from crop harvested from the field 14 by the harvester 10. The residue spreader 38 is positioned rearward of the chopper 36. In some examples, the residue spreader 38 can be mounted for pivotable movement relative to the chopper 36 between a dispersal position to disperse crop residue received from the chopper 36 onto the field 14 and a windrow position to deposit crop residue received over the residue spreader from the harvester onto the field 14 in a windrow. In other examples, the residue spreader 38 can be mounted in a fixed position relative to the chopper 36.

Figure 2:
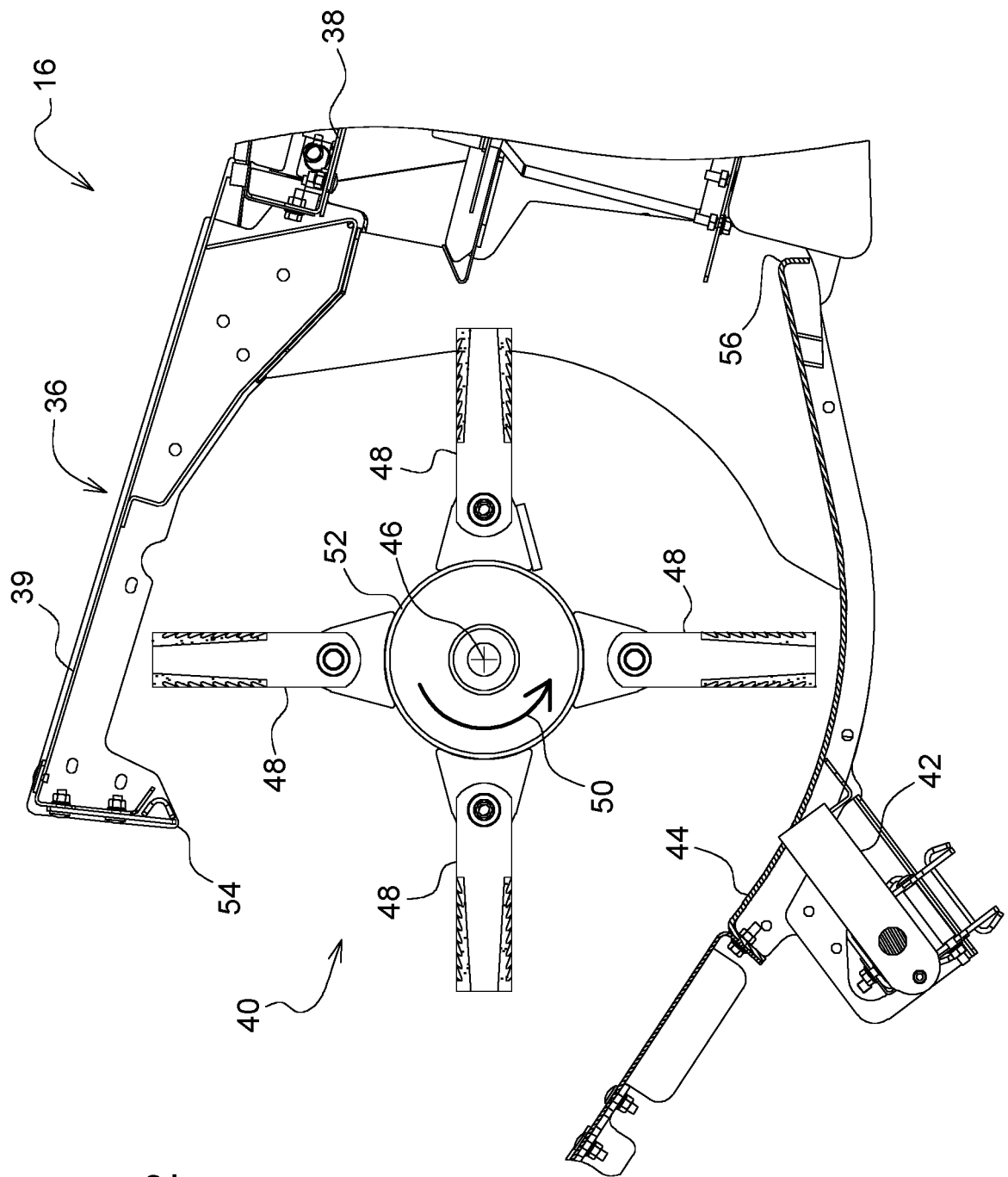
FIG. 2 is a side elevational view showing the chopper which has plurality of chopper blades to chop crop residue.

Referring to FIG. 2, the chopper 36 can receive crop residue from the threshing and separating section 22 and the cleaning section 24. In some examples, the harvester 10 includes a door that is closed to direct crop residue from the threshing and separating section 22 and the beater 34 to the chopper 36 for chopping when the residue spreader 38 is positioned in the dispersal position. When the residue spreader 38 is positioned in the windrow position, the door is closed to direct crop residue from the threshing and separating section 22 and the beater 34 over the top of the residue spreader 38 to deposit crop residue onto the field 14 in a windrow. In some examples, the chopper 36 can receive crop residue in the form of, for example, chaff from the cleaning section 24 in one or both of the dispersal position and the windrow position.

The chopper 36 includes a housing 39, a rotor 40, and a bank of counter-knives 42. The rotor 40 is mounted to the housing 39 and positioned in an interior region 44 of the housing 39 for rotation therein about an axis of rotation 46 relative to the housing 39. The rotor 40 includes chopper blades 48 that interact with the bank of counter-knives 42 to chop crop residue upon rotation of the rotor 40 about the axis of rotation 46 in a chopping direction 50. The blades 48 are mounted to the periphery of a hub 52 of the rotor 40. In the illustrated example, the rotor is a flail rotor, such that the blades 48 are flail blades.

The chopper 36 includes an inlet 54 and an outlet 56. Crop residue from the threshing and separating section 22 and beater 34 can enter the chopper 36 through the inlet 54 into the interior region 44. Crop residue can exit the chopper 36 from the interior region 44 through the outlet 56 to the residue spreader 38.

In some examples, the residue spreader 38 includes a right spreading device and a left spreading device laterally adjacent to the right spreading device. Each spreading device is configured to disperse crop residue onto the field 14 when the residue spreader 38 is positioned in the dispersal position. The spreading device can be configured and operated in a wide variety of ways. For example, illustratively, the spreading device includes an impeller with a rotating disk and paddles depending therefrom for dispersing crop residue from the residue spreader 38.

Referring to FIGS. 3-5, each chopper blade 48 includes a blade body 58. The blade body 58 includes an attachment point 60 attached to the hub 52 of the rotor 40. The attachment point 60 may be configured, for example, as a through-hole.

The blade body 58 includes a proximal end portion 62 and a distal end portion 64. The proximal end portion 62 includes the attachment point 60. The distal end portion 64 includes an end edge 66 distal from the attachment point 60 longitudinally of the blade body 58. The blade body 58 includes a first lateral side 67 and a second lateral side 68 opposite to the first lateral side 67. The lateral sides 67, 68 are illustrated with a constant thickness, although in other examples the lateral sides 67, 68 may taper in thickness laterally outwardly.

The blade body 58 includes a cutting edge 69 of the blade 48. The cutting edge 69 is positioned on the first lateral side 67. The cutting edge 69 extends longitudinally of the blade body 58. Prior to use, the cutting edge 69 may be non-serrated and straight. With use, the cutting edge 69 may begin to wear.

The chopper blade 48 includes a hard face 70. The hard face 70 is applied on a surface 72 of the blade body 58, and is harder than the blade body 58 to promote longevity of the blade 48. The hard face 70 may be positioned on the first lateral side 67. The hard face 70 extends along the cutting edge 69 longitudinally of the blade body 58.

The hard face 70 may be applied to the surface 72 in a wide variety of ways. For example, the hard face 70 may be applied via laser cladding. In another example, the hard face 70 may be applied via a thermal spray. The hard face 70 may be applied in a single pass or in multiple passes.

The hard face 70 includes a serration pattern 76. The serration pattern 76 extends along the cutting edge 69 longitudinally of the blade body 58 such that the cutting edge 69 wears to the serration pattern 76 to match the serration pattern 76 to form corresponding serrations 78 in the cutting edge 69 with the serration pattern 76 becoming part of the cutting edge 69 during use of the blade 48. The blade 48 may thus be self-serrating.

During manufacturing, the serration pattern 76 is formed in the hard face 70, rather than in the blade body 58. As such, a machining or stamping process to form the serration pattern 76 in the blade body 58 is avoided. Rather, a simpler grinding process can be used to form the serration pattern 76 in the hard face 70.

The hard face 70 is applied as a facing that is continuous longitudinally and laterally of the blade body 58. Such a continuous layer reinforces the blade body 58 along the cutting edge 69 not only longitudinally of the blade body 58 but also laterally of the blade body 58. As indicated herein, the cutting edge 69 of the blade body 58 may wear up to the hard face 70. Over time the blade body 58 may continue to wear somewhat laterally beyond the hard face 70, as indicated by lines 79. The blade 48 may thus be self-sharpening. However, continued wear could begin to expose the hard face 70 somewhat, and lead to chipping of the hard face 70 at a laterally outer, first edge 84 thereof. Even if there is such chipping, the laterally continuous configuration of the hard face 70 provides laterally continuous reinforcement to the blade body 58 in order to resist wear of the blade body 58.

Being continuous longitudinally and laterally of the blade body 58, a width 80 of the hard face 70 (in the lateral dimension of the blade body 58) may be substantially greater than a thickness 82 of the hard face 70. The width 80 may vary or be generally constant. The thickness 82 may be generally constant or could vary (e.g., the thickness 82 along the edges of the hard face 70 may be rounded, tapered, or otherwise change). For example, without limitation, a width 80 of the hard face 70 may be about 17 millimeters or more or less, whereas a thickness 82 of the hard face 70 may be between about 0.2 millimeters and about 0.8 millimeters.

In the illustrated example of FIGS. 3-5, the hard face 70 has a varying width 80 and a generally constant thickness 82. The hard face 70 extends longitudinally of the blade body 58 from the end edge 66. The hard face 70 includes the laterally outer, first edge 84 which defines the serration pattern 76 and a laterally inner, second edge 86 spaced from the first edge 84 laterally inwardly of the blade body 58. The first and second edges 84, 86 extend longitudinally of the blade body 58, and the second edge 86 is straight. The hard face 70 may cover a corner region 88 of the blade body 58 defined between the end edge 66 and the cutting edge 69 to reinforce the corner region 88.

Figure 6:
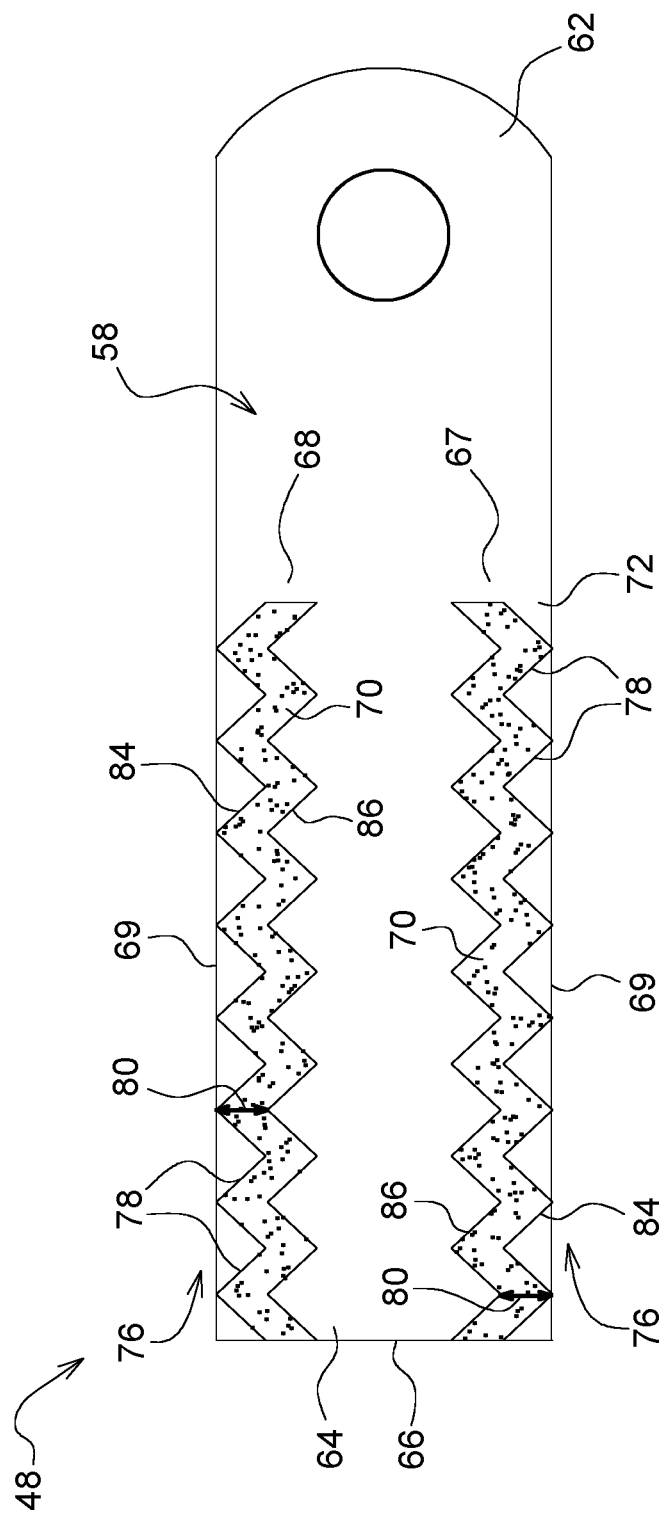
FIG. 6 is a side elevational view showing a second embodiment of the serrated hard face applied to the surface of the blade body, the hard face having a zig-zag shape.

Referring to FIG. 6, the hard face 70 is embodied as having a generally constant width 80. The first and second edges 84, 86 are parallel to one another and extend longitudinally of the blade body 58 in a zig-zag manner according to the serration pattern 76. The example of the blade 48 in FIG. 6 is otherwise similar to the example of the blade 48 in FIGS. 3-5.

Referring to FIGS. 3 and 6, the blade 48 may be configured to be reversible. In such a case, the blade 48 may have a second hard face 70 on the second lateral side 68 of the blade body 58. If the cutting edge 69 on the first lateral side 67 becomes too worn (hard face 70 and/or blade body 58), the blade 48 can be flipped over to present the cutting edge 69 on the second lateral side 68 for use.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A chopper blade for use in an agricultural harvester chopper to chop crop residue, the chopper blade comprising:
   a blade body comprising a non-serrated cutting edge of the chopper blade,
   a hard face applied on a surface of the blade body, the hard face harder than the blade body, the hard face being a continuous layer along the blade body, the hard face comprising a serration pattern along the cutting edge such that the cutting edge wears to the serration pattern to match the serration pattern to form corresponding serrations in the cutting edge with the serration pattern becoming part of the cutting edge of the chopper blade during use of the chopper blade.

2. The chopper blade of claim 1, wherein the hard face extends along the cutting edge longitudinally of the blade body.

3. The chopper blade of claim 2, wherein the blade body comprises an attachment point to attach to a rotor of an agricultural harvester chopper and an end edge distal from the attachment point longitudinally of the blade body, and the hard face extends longitudinally of the blade body from the end edge.

4. The chopper blade of claim 1, wherein the hard face comprises a first edge defining the serration pattern and a second edge spaced from the first edge laterally of the blade body, the first and second edges extend longitudinally of the blade body, and the second edge is straight.

5. The chopper blade of claim 1, wherein the hard face comprises a first edge defining the serration pattern and a second edge spaced from the first edge laterally of the blade body, and the first and second edges extend longitudinally of the blade body in a zig-zag manner according to the serration pattern.

6. An agricultural harvester chopper comprising the chopper blade of claim 1.

7. The agricultural harvester chopper of claim 6, wherein the chopper blade is a flail chopper blade.

* * * * *